(12) United States Patent
Chen

(10) Patent No.: US 12,276,727 B2
(45) Date of Patent: Apr. 15, 2025

(54) TARGET FOLLOWING METHOD, DEVICE, APPARATUS AND SYSTEM

(71) Applicant: GuangZhou Prominent Industrial Co., LTD, Guangdong (CN)

(72) Inventor: Nianchun Chen, Guangzhou (CN)

(73) Assignee: GUANGZHOU PROMINENT INDUSTRIAL CO., LTD, Guangdong (CN)

( * ) Notice: Subject to any disclaimer, the term of this patent is extended or adjusted under 35 U.S.C. 154(b) by 427 days.

(21) Appl. No.: 17/934,789

(22) Filed: Sep. 23, 2022

(65) Prior Publication Data
US 2023/0111347 A1 Apr. 13, 2023

(30) Foreign Application Priority Data
Oct. 9, 2021 (CN) .......................... 202111176622.6

(51) Int. Cl.
*G01S 13/93* (2020.01)
*G01S 13/02* (2006.01)
*G01S 13/931* (2020.01)

(52) U.S. Cl.
CPC ........ *G01S 13/931* (2013.01); *G01S 13/0209* (2013.01); *G01S 2013/9318* (2020.01); *G01S 2013/93185* (2020.01); *G01S 2013/9319* (2020.01); *G01S 2013/9321* (2013.01); *G01S 2013/93271* (2020.01); *G01S 2013/9329* (2020.01)

(58) Field of Classification Search
CPC .......................... G01S 13/931; G01S 13/0209
See application file for complete search history.

*Primary Examiner* — Timothy A Brainard
*Assistant Examiner* — Helena H Seraydaryan
(74) *Attorney, Agent, or Firm* — GREENBLUM & BERNSTEIN, P.L.C.

(57) ABSTRACT

The present disclosure relates to a target following method, device, apparatus and system. The method includes: acquiring first orientation data sent by a UWB base station arranged on a target following apparatus and a following mode sent by a UWB beacon arranged on a target to be followed; processing, based on the following mode, the first orientation data to obtain second orientation data including a current distance between a target position and the UWB base station, and a second azimuth angle of a line where the target position and the UWB base station are located with respect to a current direction of a movement of the target following apparatus; and comparing the second orientation data with preset orientation data to obtain a comparison result, and controlling the target following apparatus to perform target following according to the comparison result.

10 Claims, 9 Drawing Sheets

Acquire first orientation data sent by an UWB base station arranged on a target following apparatus and a following mode sent by a UWB beacon arranged on a target to be followed, the first orientation data including a current distance between the UWB beacon and the UWB base station, a first azimuth angle of a straight line in which the UWB beacon and the UWB base station are located with respect to a current orientation of an antenna of the UWB base station, and a first angle between the current orientation of the antenna of the UWB base station and a current direction of a motion of the target following apparatus — S202

Process, based on the following mode, the first orientation data to obtain second orientation data including a current distance between a target position and the UWB base station and a second azimuth angle of a straight line in which the target position and the UWB base station are located with respect to the current direction of the motion of the target following apparatus — S204

Compare the second orientation data with preset orientation data to obtain a comparison result, and controlling the target following apparatus to perform target following according to the comparison result — S206

```
┌─────────────────────────────────────────────────────────────────────┐
│ Acquire first orientation data sent by an UWB base station arranged on a target  │
│  following apparatus and a following mode sent by a UWB beacon arranged on a     │
│    target to be followed, the first orientation data including a current distance│
│    between the UWB beacon and the UWB base station, a first azimuth angle of a   │─── S202
│     straight line in which the UWB beacon and the UWB base station are located   │
│  with respect to a current orientation of an antenna of the UWB base station, and a│
│     first angle between the current orientation of the antenna of the UWB base   │
│       station and a current direction of a motion of the target following apparatus│
└─────────────────────────────────────────────────────────────────────┘
                                       │
                                       ▼
┌─────────────────────────────────────────────────────────────────────┐
│ Process, based on the following mode, the first orientation data to obtain second│
│   orientation data including a current distance between a target position and the│─── S204
│     UWB base station and a second azimuth angle of a straight line in which the   │
│  target position and the UWB base station are located with respect to the current │
│               direction of the motion of the target following apparatus          │
└─────────────────────────────────────────────────────────────────────┘
                                       │
                                       ▼
┌─────────────────────────────────────────────────────────────────────┐
│   Compare the second orientation data with preset orientation data to obtain a   │
│    comparison result, and controlling the target following apparatus to perform  │─── S206
│                target following according to the comparison result               │
└─────────────────────────────────────────────────────────────────────┘
```

FIG. 1

```
┌─────────────────────────────────────────────────────────────────────┐
│   Process a lateral safety distance and the distance between the UWB beacon and  │
│     the UWB base station by using an inverse trigonometric function to obtain a  │─── S302
│  second angle, and obtain the current distance between the target position and the│
│   UWB base station based on the second angle and the current distance between    │
│                    the UWB beacon and the UWB base station.                      │
└─────────────────────────────────────────────────────────────────────┘
                                       │
                                       ▼
┌─────────────────────────────────────────────────────────────────────┐
│ Determine the second azimuth angle based on the first azimuth angle, the first   │─── S304
│                          angle and the second angle                              │
└─────────────────────────────────────────────────────────────────────┘
```

FIG. 2

TARGET FOLLOWING METHOD, DEVICE, APPARATUS AND SYSTEM

CROSS-REFERENCE TO RELATED DISCLOSURES

This application claims priority to Chinese patent application No. 2021111766226 filed with the Chinese Patent Office on Oct. 9, 2021, entitled "TARGET FOLLOWING METHOD, DEVICE, APPARATUS AND SYSTEM", the entire content of which is incorporated by reference.

TECHNICAL FIELD

This disclosure relates to the target following techniques, and in particular, to a target following method, a target following device, a target following apparatus, and a target following system.

BACKGROUND

With the development of industry and science, more and more tools that convenient for people's life have appeared, such as electric vehicles, self-balanced vehicles and other means of transportation. These means of transportation have also been gradually developed to follow people's movement trajectories. Meanwhile, there are some other tools that can follow people's movement trajectories such as luggage, which improve the convenience of people's travel. The target following method for the target following apparatus such as the electric vehicles and the self-balancing vehicles needs to be more diversified and more practical.

SUMMARY

In order to solve the above-mentioned problems, the present disclosure provides a target following method, a target following device, a target following apparatus and a target following system.

In a first aspect, the target following method is provided. The target following method includes: acquiring first orientation data sent by an UWB base station and a Mowing mode sent by an UWB beacon, the UWB base station being arranged on a target following apparatus, the UWB beacon being arranged on a target to be followed, the first orientation data including a current distance between the UWB beacon and the UWB base station, a first azimuth angle of a straight line in which the UWB beacon and the UWB base station are located with respect to a current orientation of an antenna of the UWB base station, and a first angle between the current orientation of the antenna of the UWB base station and a current direction of a movement of the target following apparatus; processing, based on the following mode, the first orientation data to obtain second orientation data, the second orientation data includes a current distance between a target position and the UWB base station, and a second azimuth angle of a straight line in which the target position and the UWB base station are located with respect to the current direction of the movement of the target following apparatus; and comparing the second orientation data with preset orientation data to obtain a comparison result, and controlling the target following apparatus to perform target following according to the comparison result.

In an embodiment, the straight line in which the target position and the UWB base station are located is perpendicular to a straight line its which the target position and the UWB beacon are located. The processing, based on the following mode, the first orientation data to obtain second orientation data includes: processing a lateral safety distance and the distance between the UWB beacon and the UWB base station by using an inverse trigonometric function to obtain a second angle between the straight line in which the UWB beacon and the UWB base station are located and the straight line in which the target position and the UWB base station are located; obtaining a current distance between the target position and the UWB base station based on the second angle and the current distance between the UWB beacon and the UWB base station; and determining a second azimuth angle based on the first azimuth angle, the first angle and the second angle.

In an embodiment, the following mode includes a first side following mode, a second side following mode, and a third side following mode. The determining the second azimuth angle based on the first azimuth angle, the first angle and the second angle includes: calculating the second azimuth angle based on a following equation on a condition that the following mode is the first side following mode:

$a=c+b-d;$ calculating the second azimuth angle based on a following equation on a condition that the following mode is the second side following mode:

$a=c+b+d;$ calculating the second azimuth angle based on a following equation on a condition that the following mode is the third side following mode:

$a=b+c;$ where a is the second azimuth angle, b is the first azimuth angle, c is the first angle, and d is the second angle.

In an embodiment, the preset orientation data includes a minimum following distance. The controlling the target following apparatus to perform target following according to the comparison result includes: controlling the target following apparatus to stop on a condition that the comparison result is that the current distance between the target position and the UWB base station is less than or equal to the minimum following distance; and controlling the target following apparatus to move to the target position on a condition that the comparison result is that the current distance between the target position and the UWB base station is greater than the minimum following distance.

In an embodiment, the preset orientation includes a range of angle errors. The controlling the target following apparatus to perform the target following according to the comparison result includes: controlling the target following apparatus to turn to a first direction on a condition that the comparison result is that the second azimuth angle is less than zero and the second azimuth angle is outside the range of angle errors; controlling the target following apparatus to turn to a second direction on a condition that the comparison result is that the second azimuth angle is greater than zero and the second azimuth angle is outside the range of angle errors; and controlling the target following apparatus to move along a current direction of the movement of the target following apparatus on a condition that the comparison result is that the second azimuth angle is within the range of angle errors.

In a second aspect, the target following device is provided. The target following device includes: a data acquiring module configured to acquire first orientation data sent by an UWB base station and a following mode sent by an UWB beacon, the UWB base station being arranged on a target following apparatus, the UWB beacon being arranged on a target to be followed, the first orientation data including a current distance between the UWB beacon and the UWB base station, a first azimuth angle of a straight line in which the UWB beacon and the UWB base station are located with respect to a current orientation of an antenna of the UWB base station, and a first angle between the current orientation of the antenna of the UWB base station and a current direction of a movement of the target following apparatus; a data processing module configured to process the first orientation data to obtain second orientation data based on the following mode, the second orientation data including a current distance between a target position and the UWB base station, and a second azimuth angle of a straight line in which the target position and the UWB base station are located with respect to the current direction of the movement of the target following apparatus; and a data comparison module configured to compare the second orientation data with preset orientation data to obtain a comparison result, and control the target following apparatus to perform target following according to the comparison result.

In a third aspect, the target following apparatus is provided. The target following apparatus includes: an UWB base station; a motion mechanism; and a controller connected to the UWB base station and the motion mechanism respectively. The UWB base station is configured to detect and output a first orientation. The first orientation data includes a current distance between the UWB beacon and the UWB base station, a first azimuth angle of a straight line in which the UWB beacon and the UWB base station are located with respect to a current orientation of an antenna of the UWB base station, and a first angle between the current orientation of the antenna of the UWB base station and a current direction of a movement of the target following apparatus. The controller is configured to execute steps of any one of the embodiments in the first aspect, and control actions of the motion mechanism.

In an embodiment, the target following apparatus further includes a rotating mechanism. The rotating mechanism is configured to carry an antenna of the UWB base station to perform 360-degree rotation to track a direction of an UWB beacon to make the antenna of the UWB base station always face the UWB beacon.

In a fourth aspect, the target following system is provided. The target following system includes an UWB beacon and the target following apparatus of any one of the embodiments in the third aspect. The UWB beacon is arranged on a target to be followed. The UWB beacon is configured to send a following mode to the target following apparatus. The target following apparatus is configured to receive the following mode and perform target following based on the following mode.

In a fifth aspect, the present disclosure provides a computer-readable storage medium, on which a computer program is stored. When the computer program is executed by a processor, steps of the target following method according to any one of the embodiments in the first aspect are executed.

BRIEF DESCRIPTION OF THE DRAWINGS

In order to illustrate the technical solutions in the embodiments of the present disclosure or related art more clearly, the accompanying drawings used in the description of the embodiments or related art will be briefly introduced below. Apparently, the accompanying drawings in the following description are only some embodiments of the present disclosure. For those of ordinary skill in the art, other drawings can also be derived from these drawings without creative effort.

FIG. 1 is a schematic flowchart of a target following method according to an embodiment.

FIG. 2 is a schematic flowchart showing steps of processing first orientation data to obtain second, orientation data according to an embodiment.

DETAILED DESCRIPTION OF THE EMBODIMENTS

Figure 3:
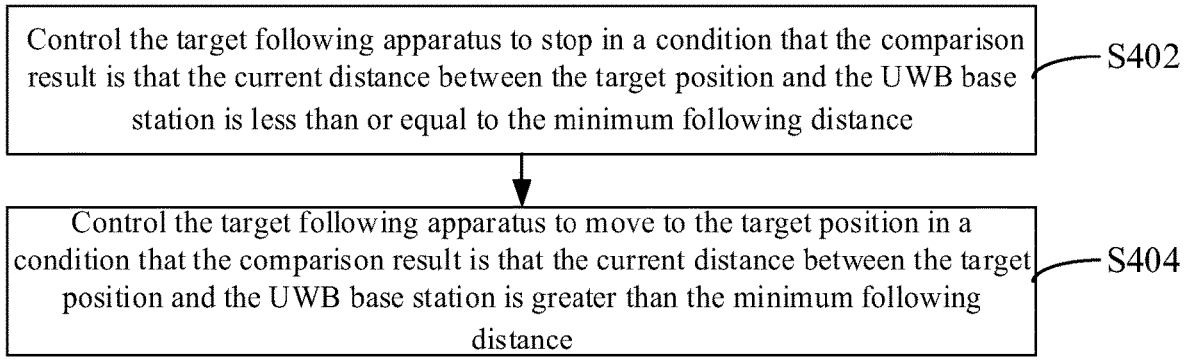
FIG. 3 is a schematic flowchart showing steps of controlling a movement of a target following apparatus based on a comparison result according to an embodiment.

In order to facilitate understanding of the present disclosure, the present disclosure will be described more fully below with reference to related drawings. Embodiments of the present disclosure are presented in the drawings. However, the disclosure may be implemented in many different forms and is not limited to the embodiments described herein. Conversely, these embodiments are provided to make the disclosure more thorough and comprehensive.

Unless otherwise defined, all technical and scientific terms used herein have the same meaning as commonly understood by one of ordinary skill in the technical field to which this disclosure belongs. The terms used herein in the specification of the disclosure are for the purpose of describing specific embodiments only, and are not intended to limit the disclosure.

It will be understood that the terms "first", "second", etc. used in this disclosure may be used herein to describe various elements, but these elements are not limited by these terms. These terms are only used to distinguish a first element from another element.

Spatial relational terms such as "under", "below", "above" in this disclosure may be used to describe a relationship between one element or feature and other elements or features shown in the drawings. It should be understood that in addition to orientations shown in the drawings, the spatial relational terms further include different orientations of a device in use and operation. For example, if the device in the drawing is turned over, elements or features described as "below" or "under" would then be oriented "above" the other elements or features. Thus, the exemplary terms "below" and "under" can include both an orientation of above and below. In addition, the device may also be otherwise oriented (e.g., rotated 90 degrees or at other orientations) and the spatial descriptors used herein interpreted accordingly.

It should be noted that when an element is referred to as being "connected" to another element, it can be directly connected to the other element or connected to the other element through intervening elements. In addition, the "connection" in the following embodiments should be "electrical connection", "communication connection" and the like if there is transmission of electrical signals or data between the objects to be connected.

As used herein, singular farms "a" "an" and "the" can include plural arms as well, unless the context clearly dictates otherwise. It should also be understood, that the terms "includes/contains" or "have" etc. designate the presence of stated features, integers, steps, operations, components, parts, or combination thereof, but do not exclude the possibility of the presence or addition of one or more other features, integers, steps, operations, components, parts, or combinations thereof.

In an embodiment as shown in FIG. 1, a target following method is provided. The target following method includes the following steps.

At step 202, first orientation data sent by an ultra wide band (UWB) base station and a following mode sent by an UWB beacon are acquired. The UWB base station is arranged on a target following apparatus, and the UWB beacon is arranged on a target which is an object to be followed by the target following apparatus. The first orientation data includes a current distance between the UWB beacon and the UWB base station, a first azimuth angle of a line in which the UWB beacon and the UWB base station are located with respect to a current orientation of an antenna of the UWB base station, and a first angle between the current orientation of the antenna of the UWB base station and a current direction of a movement of the target following apparatus.

The UWB is a wireless carrier communication technology, which does not use a sinusoidal carrier, but uses nanosecond non-sinusoidal narrow pulses to transmit data instead of sinusoidal carriers, so it occupies a wide spectrum. The UWB has advantages of low system complexity, low power spectral density of transmitted signal, insensitivity to channel fading, low interception capability, and high positioning accuracy, and the UWB is particularly suitable for high-speed wireless access in dense multipath places such as indoor, in the present disclosure, the latest UWB with 10 cm level high-precision positioning technology can be used to achieve precise positioning, a frequency hand can range from 1 G to 6.5 G, which has stronger penetrating power, and it is not easy to cause signal shielding due to occlusion, thereby improving the reliability of following. The target following apparatus can be an electric vehicle, and can also be other moving objects that can be controlled by a controller, such as a vehicle with other forms of power, a powered luggage case with steering control.

The UWB base station is a kind of equipment designed based on the UWB technology, which is mainly configured to receive UWB signals to achieve positioning function. The UWB base station may mainly include an antenna, an internal circuit board, and a housing. The antenna may include an internal antenna and an external antenna. The housing may be a normal housing, and may also be an IP67 compliant housing. The UWB base station may transmit data by wire or wireless means, for example, the data may be transmitted by optical cable, network cable, wireless fidelity (Wi-Fi), bridge, the 4th generation mobile communication technology (4G), etc. The UWB base station generally cooperates with the UWB beacon to achieve the positioning function.

The UWB beacon is a kind of beacon designed based on the UWB technology for personnel positioning. The UWB beacon is capable of sending pulse signals to the UWB base station according to a preset communication frequency, so as to realize real-time accurate positioning of the personnel. The UWB beacon may be powered by a rechargeable lithium battery with a capacity of 900 mAh, and the battery can be used continuously for 3 months to 5 months when fully charged. In addition, the UWB beacon can also have an SOS key to realize a one-click distress function. An update rate of positioning information between the UWB base station and the UWB beacon can range from 10 times per second to 200 times per second or more. The UWB beacon in the present disclosure may also include components such as buttons, the battery, and a display unit. Two-way data transmission may also be implemented between the UWB beacon and the UWB base station, and therefore, the target following apparatus can perform different following modes, and can also be remotely controlled by the UWB beacon. Operating parameters of the target following apparatus may also be sent to the UWB beacon by the UWB base station and displayed by the display unit of the UWB beacon, thus, the target can obtain operating state of the target following apparatus at any time, and the controllability and reliability of the target following is improved. The UWB base station and the UWB beacon can be designed to realize miniaturization, and the miniaturized UWB base station makes the design of the target following apparatus more flexible. The miniaturized UWB beacon can be made into an apparatus with a size of a small remote control or a watch, which improves portability and usability of the UWB beacon, and makes the UWB beacon more convenient to use.

The current distance between the UWB beacon and the UWB base station is equal to a current distance between the target and the target following apparatus. The antenna of the UWB base station can always face a direction of ±5° of the UWB beacon (positive and negative errors are less than ±60°) to meet an effective measurement angle±60 of the antenna. The first angle between the current orientation of the antenna of the UWB base station and the current direction of the movement of the target following apparatus may range from −180° to 180°.

In detail, in the present disclosure, the first orientation data sent by the UWB base station arranged on the target following apparatus is acquired. The first orientation data includes the current distance between the UWB beacon and the UWB base station, the first azimuth angle of the line in which the UWB beacon and the UWB base station are located with respect to the current orientation of the antenna of the UWB base station, and the first angle between the current orientation of the antenna of the UWB base station and the current direction of the movement of the target following apparatus. And the following mode sent by the UWB beacon arranged on the target is acquired.

At step 204, the first orientation data is processed based on the following mode to obtain second orientation data. The second orientation data includes a second azimuth angle and a current distance between a target position and the UWB base station, the second azimuth angle is an azimuth of a straight line in which the target position and the UWB base station are located with respect to the current direction of the movement of the target following apparatus.

The target position is a position that the target following apparatus needs to follow according to the following mode.

In detail, on a condition that the first orientation data sent by the UWB base station and the following mode sent by the UWB beacon are acquired, the first orientation data is processed to obtain the second orientation data based on the following mode. The second orientation data includes the current distance between the target position and the UWB base station, and the second azimuth angle of the straight line in which the target position and the UWB base station are located with respect to the current direction of the movement of the target following apparatus.

In an embodiment, the straight line in which the target position and the UWB base station are located is perpendicular to the straight line in which the target position and the UWB beacon are located.

Referring to FIG. 2, processing the first orientation data based on the following mode to obtain the second orientation data includes steps 302 and 304.

At step 302, a lateral safety distance and the distance between the UWB beacon and the UWB base station are processed by using an inverse trigonometric function to obtain a second angle, and the current distance between the target position and the UWB base station are obtained based on the second angle and the current distance between the UWB beacon and the UWB base station. The second angle is the angle between the straight line in which the UWB beacon and the UWB base station are located and the straight line in which the target position and the UWB base station are located.

The lateral safety distance is a distance between the target position and the UWB beacon. The lateral safety distance can be set according to the actual situation. The lateral safety distance determines a distance between the target position followed by the target following apparatus and the target. The lateral safety distance can ensure the safety between the target following apparatus and the target during the following process. Since the straight line in which the target position and the UWB base station are located is perpendicular to the straight line in which the target position and the UWB beacon are located, a right triangle is formed between the UWB base station, the target position and the UWB beacon. On a condition that the lateral safety distance is known and the current distance between the UWB beacon and the UWB base station is obtained, the second angle between the straight line in which the UWB beacon and the UWB base station are located and the straight line in which the target position and the UWB base station are located can be calculated by using the inverse trigonometric function, and the current distance between the target position and the UWB base station can also be obtained.

In detail, the second angle between the straight line in which the UWB beacon and the UWB base station are located and the straight line in which the target position and the UWB base station are located can be calculated by processing the lateral safety distance and the current distance between the UWB beacon and the UWB base station using the inverse trigonometric function. For example, the second angle is equal to arcsin (lateral safety distance/current distance between the UWB beacon and the UWB base station). The current distance between the target position and the UWB base station can be calculated according to the second angle and the current distance between the UWB beacon and the UWB base station, for example, the current distance between the target position and the UWB base station is equal to the current distance between the UWB beacon and the UWB base station*cos (the second angle).

In other embodiments, the Pythagorean theorem may also be used to process the lateral safety distance and the current distance between the UWB beacon and the UWB base station to obtain the current distance between the target position and the UWB base station. For example, the current distance between the target position and the UWB base station is equal to (the current distance between the UWB beacon and the UWB base station$^2$—lateral safety distance$^2$)$^{(-2)}$. Then, the second angle may be calculated according to the lateral safety distance and the current distance between the target position and the UWB base station. The second angle may also be calculated according to the lateral safety distance and the current distance between the UWB beacon and the UWB base station. The second angle may also be calculated according to the current distance between the target position and the UWB base station and the current distance between the UWB beacon and the UWB base station. For example, the second angle may be equal to arctan (lateral safety distance/current distance between the target position and the UWB base station), and may also be equal to arcsin(lateral safety distance/ current distance between the UWB beacon and the UWB base station), and may also be equal to arccos (current distance between the target position and the UWB base station current distance between the UWB beacon and the UWB base station).

Compared with calculating the current distance between the target position and the UWB base station by using the Pythagorean theorem, calculating the current distance between the target position and the UWB base station by using the inverse trigonometric function is less computationally stressful. The choice of the calculation method can be based on the actual situation.

At step 304, the second azimuth angle is determined based on the first azimuth angle, the first angle and the second angle.

In detail, the second azimuth angle of the straight line in which the target position and the UWB base station are located with respect to the current direction of the movement of the target following apparatus can be determined based on a relationship between the first azimuth angle, the first angle and the second angle on a condition that the first azimuth angle of the straight line where the UWB beacon and the UWB base station are located with respect to the current orientation of the antenna of the UWB base station, the first angle between the current orientation of the antenna of the UWB base, station and the current direction of the movement of the target following apparatus, and the second angle between the straight line in which the UWB beacon and the UWB base station are located and the straight line in which the target position and the UWB base station are located are all obtained.

In an embodiment, the following mode includes a first side following mode, a second side following mode, and a third side following mode.

The step 304 of determining the second azimuth angle based on the first azimuth angle, the first angle and the second angle may include:

calculating the second azimuth angle based on the following equation on a condition that the following mode is the first side following mode:

$a = c + b - d;$ calculating the second azimuth angle based on the following equation on a condition that the following mode is the second side following mode:

$$a = c + b + d;$$

calculating the second azimuth angle based on the following equation on a condition that the following mode is the third side following mode:

$$a = b + c;$$

where a is the second azimuth angle, b is the first azimuth angle, c is the first angle, and d is the second angle.

The first side following mode may be that the target position is always kept in a direction of rotating the current direction of the movement of the target by 90 degrees counterclockwise, that is, the target position is always kept on a left side of the current direction of the movement of the target to be followed. The second side following mode may be that the target position is always kept in a direction that rotating the current direction of the movement of the target by 90 degrees clockwise, that is, the target position is always kept on a right side of the current direction of the movement of the target to be followed. The third side following mode may be that the target position is always kept in a direction of rotating the current movement direction of the target by 180 degrees, that is, the target position is always kept behind the current direction of the movement of the target to be followed. In the third side following mode, the lateral safety distance is zero, that is, in the third side following mode, the target position is the position of the target, and thus the second angle between the straight line where the UWB beacon and the UWB base station are located and the straight line where the target position and the UWB base station are located is zero. The current distance between the target position and the UWB base station is equal to the current distance between the UWB beacon and the UWB base station.

In detail, on a condition that the following mode sent by the UWB beacon is the first side following mode, the second azimuth angle can be obtained based on the relationship between the obtained first angle, the second angle and the first azimuth angle, that is the second azimuth angle a is equal to the first angle c plus the first azimuth angle b and minus the second angle d. On a condition that the following mode sent by the UWB beacon is the second side following mode, the second azimuth angle is a sum of the first angle, the second angle and the first azimuth angle. On a condition that the following mode sent by the UWB beacon is the third side following mode, the second azimuth angle is a sum of the first angle and the first azimuth angle. The first angle, the second angle, the first azimuth angle and the second azimuth angle are all angles with direction properties.

In the present disclosure, different following modes sent by the UWB beacon are received, and the first orientation data detected by the UWB base station is processed based on the different following modes, so as to obtain the second orientation data corresponding to the following modes, and control the target following apparatus to perform target following according to the second orientation data. During the following process, if the third side following mode is performed, the target position is always kept behind the current direction of the movement of the target, and the user cannot see the state of the target following apparatus behind. On the one hand, the user may worry about losing the vehicle (the target following apparatus). On the other hand, if the target following apparatus in an accident such as rollover or collision, the user cannot notice and deal with it in time. Therefore, the first side following mode and the second side following mode can ensure that the target following apparatus is within the user's vision area, making the following process more reassuring and more conducive to avoid unexpected situations in use, and improving the safety of the following process.

At step 206, the second orientation data is compared with preset orientation data to obtain a comparison result, and the target following apparatus is controlled to perform target following according to the comparison result.

In detail, on a condition that the second orientation data is obtained, the second azimuth angle and the current distance between the target position and the UWB base station of the second orientation data can be compared with the preset orientation data, and actions of the target following apparatus can be controlled according to the comparison result, so that the target following apparatus follows the target to be followed in a corresponding mode according to the following mode sent by the UWB beacon.

In an embodiment, the preset orientation data may include a minimum following distance.

As shown in FIG. 3, in this embodiment, the step 206 of controlling the target following apparatus to perform the target following according to the comparison result includes the following steps 402-404.

At step 402, on a condition that the comparison result is that the current distance between the target position and the UWB base station is less than or equal to the minimum following distance, the target following apparatus is controlled to stop.

At step 404, on a condition that the comparison result is that the current distance between the target position and the UWB base station is greater than the minimum following distance, the target following apparatus is controlled to move to the target position.

The setting of the minimum following distance can ensure that a certain distance is maintained between the target following apparatus and the target position, so as to avoid potential safety hazards during the following process. The minimum following distance can be set according to actual needs.

In detail, the current distance between the target position and the UWB base station in the second orientation data is compared with the minimum following distance to obtain the comparison result. If the comparison result is that the current distance between the target position and the UWB base station is greater than the minimum following distance, it means that the distance between the target following apparatus and the target position is large. Therefore, it is necessary to control the target following apparatus to move toward the target position. If the comparison result is that the current distance between the target position and the UWB base station is less than or equal to the minimum following distance, it means that the distance between the target following apparatus and the target position is too close, which may cause safety hazards. Therefore, it is necessary to control the target following apparatus to brake and stop until the current distance between the target position and the UWB base station is greater than the minimum following distance, and control the target following apparatus to move to the target position again.

Furthermore, a moving speed V of the target following apparatus may be calculated based on a following equation: $V = K*(L - Ls)$, where K is a speed control constant, L is the current distance between the target position and the UWB base station, and Ls is the minimum following distance. The equation means that controlling the moving speed of the target following apparatus gradually decreases as the distance between the target position and the UWB base station gets shorter. That is, when the target following apparatus is far away from the target position, the moving speed of the target following apparatus is larger, and the moving speed of the target following apparatus is getting less during the target following apparatus is gradually approaching to the target position, thus controlling the target following apparatus to rush to the vicinity of the target position as soon as possible, and improving the security when the target following apparatus is very close to the target position. The security risk brought by the target following apparatus moving too fast when it is very close to the target following object can be avoided.

In addition, in the present disclosure, the target following apparatus may also be controlled to move to the target position by using a proportion integral differential (PID) algorithm. The PID algorithm is a control algorithm that combines proportional, integral and differential. The PID algorithm is suitable for situations where a system or a controlled object is not fully known, or system parameters cannot be obtained through effective measurement methods. The essence of PID control is to perform calculations according to a functional relationship of proportional, integral and differential based on an input deviation value, and calculation results are used to control the output. The above-mentioned method of controlling the movement of the target following apparatus by using the speed control constant K is a proportion control method, which is the simplest control method, and an output of the controller is proportional to an input error signal. If the PID is used to control the target following apparatus to move toward the target position, a better control effect can be achieved, and a higher reliability and flexibility can also be achieved. It can be understood that the method for controlling the target following apparatus to move to the target position may be selected according to actual needs.

During the whole following process, the target following apparatus will continuously adjust the distance between the target following apparatus and the target position, thus the target following apparatus will always follow the target with the minimum following distance.

In the present disclosure, by setting the minimum following distance, the target following apparatus can be controlled to maintain a certain distance from the target position, thereby avoiding safety hazards caused by the following distance being too close, and ensuring that the moving speed of the target following apparatus gradually decreases when the target following apparatus is gradually approaching the target position, and further improving the safety in the following process.

In an embodiment, the preset orientation data includes range of angle errors.

Figure 4:
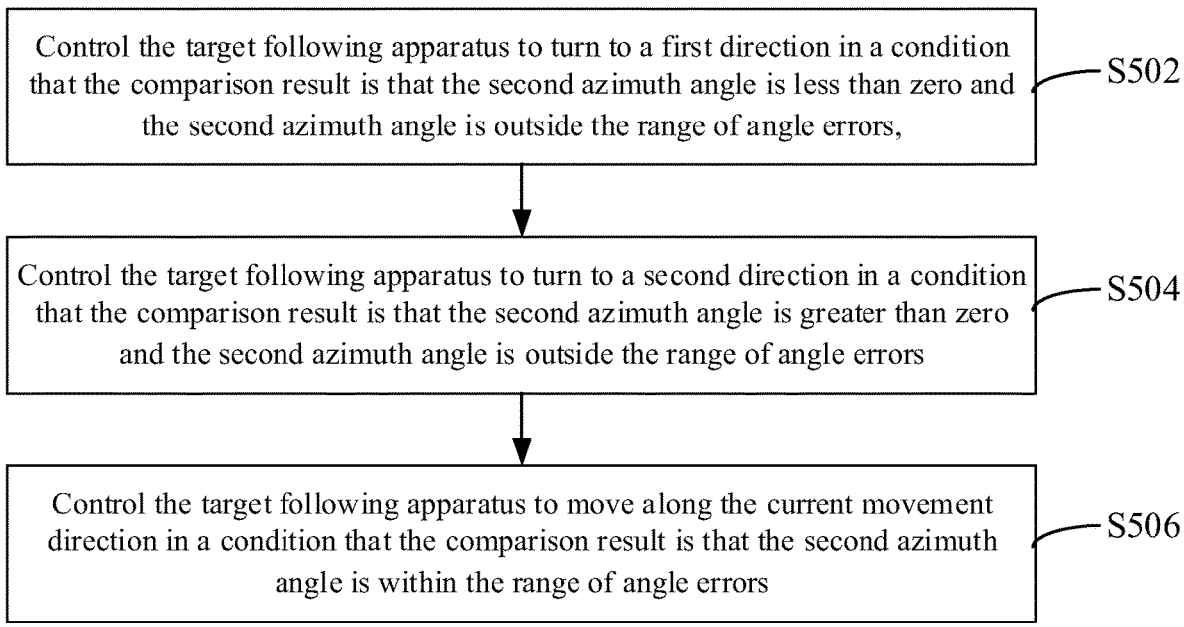
FIG. 4 is a schematic flowchart showing steps of controlling a movement of a target following apparatus based on a comparison result according to another embodiment.

Referring to FIG. 4, in this embodiment, the step 206 of controlling the target following apparatus to perform the target following according to the comparison result includes the Mowing steps 502-506.

At step 502, on a condition that the comparison result is that the second azimuth angle is less than zero and the second azimuth angle is outside the range of angle errors, the target following apparatus is controlled to turn to a first direction.

At step 504, on a condition that the comparison result is that the second azimuth angle is greater than zero and the second azimuth angle is outside the range of angle errors, the target following apparatus is controlled to turn to a second direction.

At step 506, on a condition that the comparison result is that the second azimuth angle is within the range of angle errors, the target following apparatus is controlled to move along a current direction of the movement of the target following apparatus.

The range of angle errors is used to adjust the direction of the movement of the target following apparatus. The first direction may be a direction that rotates the current direction of the movement of the target following apparatus by 90 degrees counterclockwise. The second direction may be a direction that rotates the current direction of the movement of the target following apparatus by 90 degrees clockwise.

In detail, the second azimuth angle is compared with the range of angle errors tea obtain the comparison result. If the comparison result is that the second azimuth angle is less than zero and the second azimuth angle is outside the range of angle errors, it means that the target position is located on a left side of the current direction of the movement of the target following apparatus, and the target following apparatus is controlled to turn to the first direction, that is, the target following apparatus is controlled to turn to the left side of the current direction of the movement. If the comparison result is that the second azimuth angle is greater than zero and the second azimuth angle is outside the range of angle errors, it means that the target position is located on a right side of the current direction of the movement of the target following apparatus, and the target following apparatus is controlled to turn to the second direction, that is, the target following apparatus is controlled to turn to the right side of the current direction of the movement. If the comparison result is that the second azimuth angle is within the range of angle errors, it means that the current direction of the movement of the target following apparatus is within the error angle, and the target position is substantially located in the current direction of the movement of the target following apparatus. Therefore, the target following apparatus is controlled to go straight along the current direction of the movement.

During the whole following process, the target following apparatus gradually adjusts the current direction of the movement to ensure that the second angle is within the range of angle errors, that is, to ensure that the target position is substantially located in the current direction of the movement of the target following apparatus. By controlling the target following apparatus to continuously adjust the current direction of the movement and a positional relationship between the target following apparatus and the target position, the target following apparatus can maintain the following state corresponding to the following mode, and keep following the target position with the minimum following distance.

Figure 5:
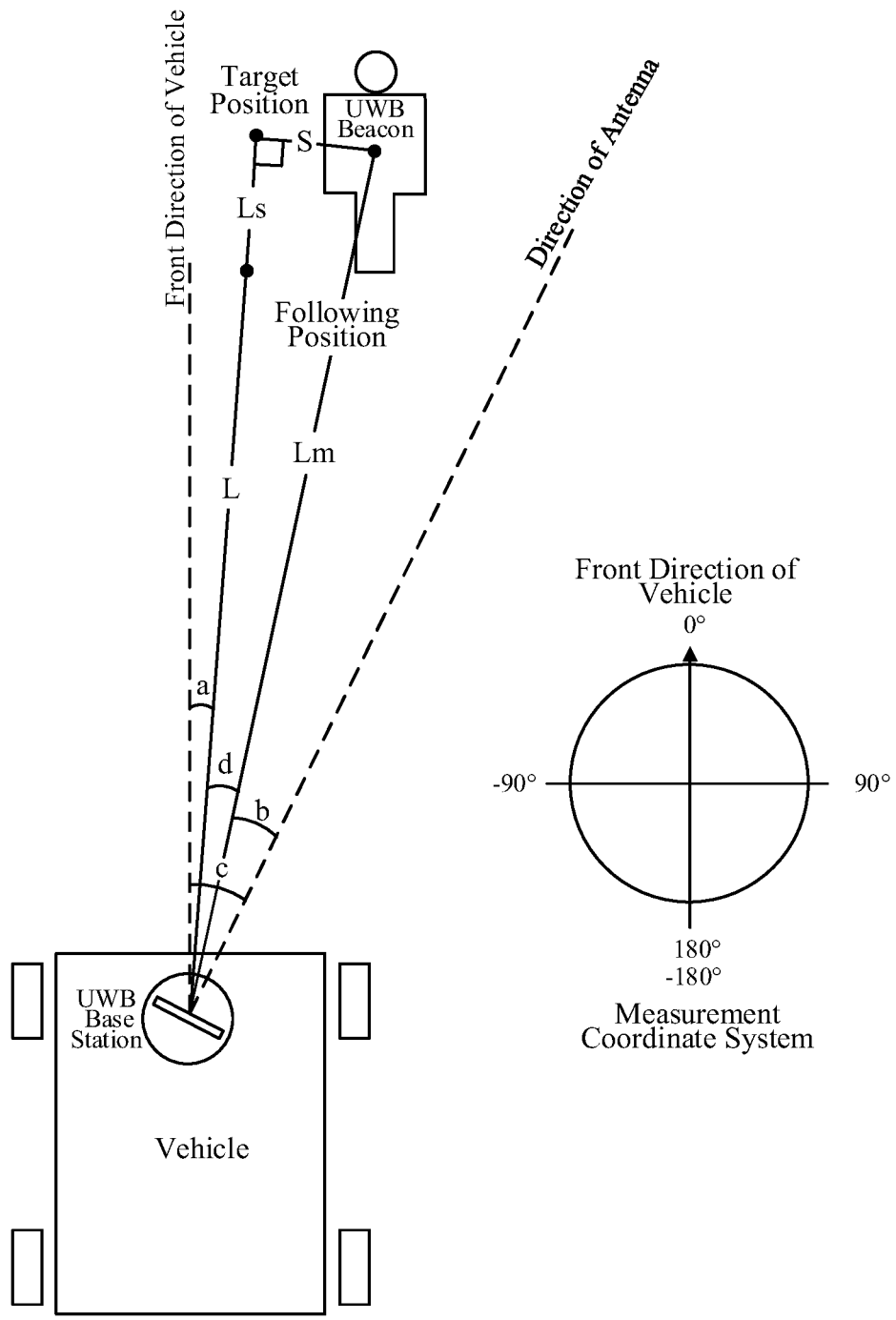
FIG. 5 is a schematic diagram showing a principle of a first side following mode according to an embodiment.
Figure 6:
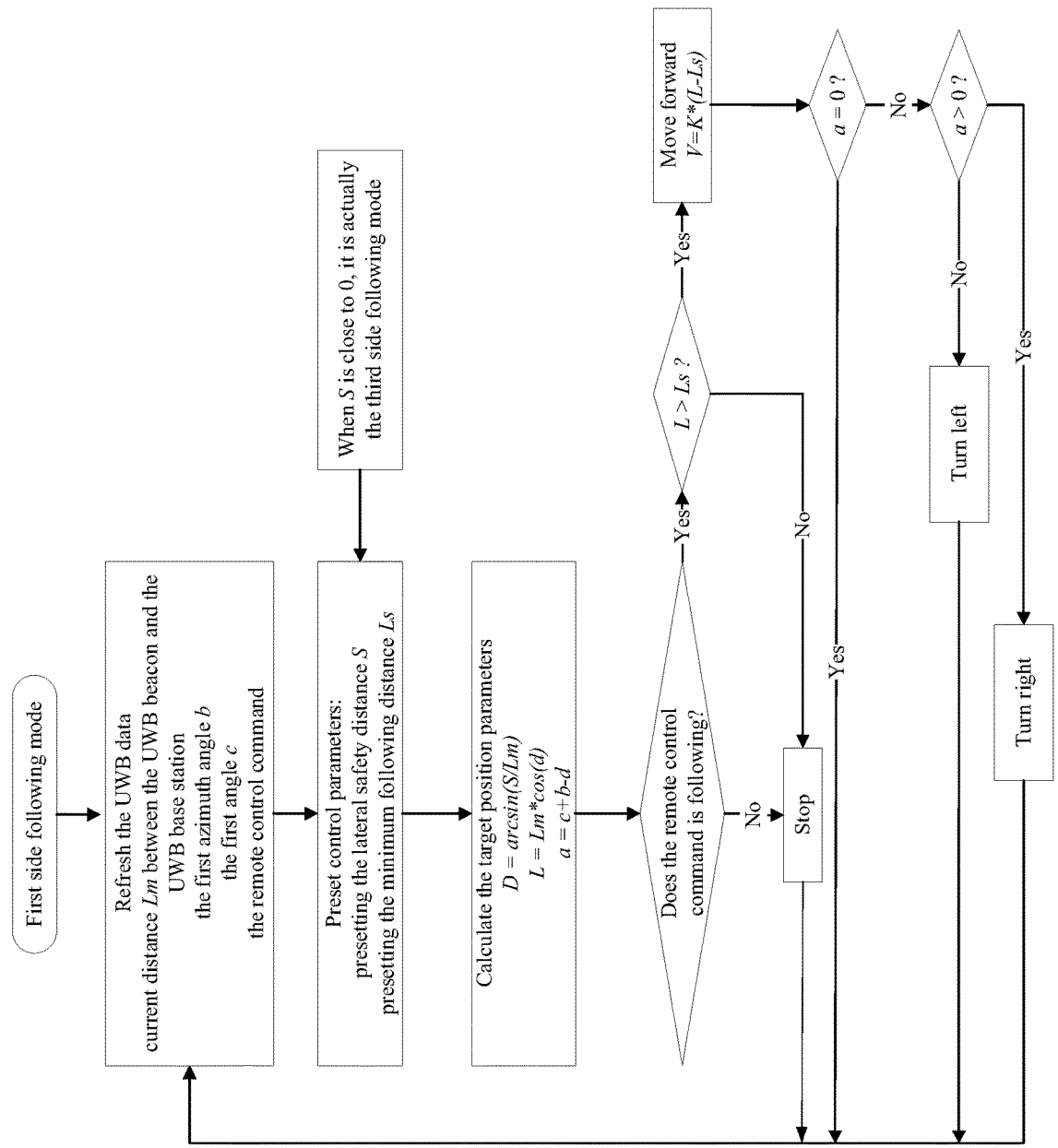
FIG. 6 is a schematic diagram showing a control process of the first side following mode according to an embodiment.

In an example, FIG. 5 shows a principle of the first side following mode, and FIG. 6 shows a control flow in the first side following mode. In this example, the target to be followed is a person, and the target following apparatus is a vehicle. A front direction of the vehicle is the current direction of the movement of the target following apparatus. The direction of the antenna is the current direction of the antenna of the UWB base station. a is the second azimuth angle of the line where the target position and the UWB base station are located with respect to the current direction of the movement of the target following apparatus, b is the first azimuth angle of the line in which the UWB beacon and the UWB base station are located with respect to the current orientation of the antenna of the UWB base station. c is the first angle between the current orientation of the antenna of the UWB base station and the current movement direction of the target following apparatus. d is the second angle between the line where the UWB beacon and the UWB base station are located and the line where the target position and the UWB base station are located. L is the current distance between the target position and the UWB base station. Lm is the current distance between the UWB beacon and the UWB base station. S is the lateral safety distance. Ls is the minimum following distance. V is the moving speed. K is the speed control constant.

Figure 7:
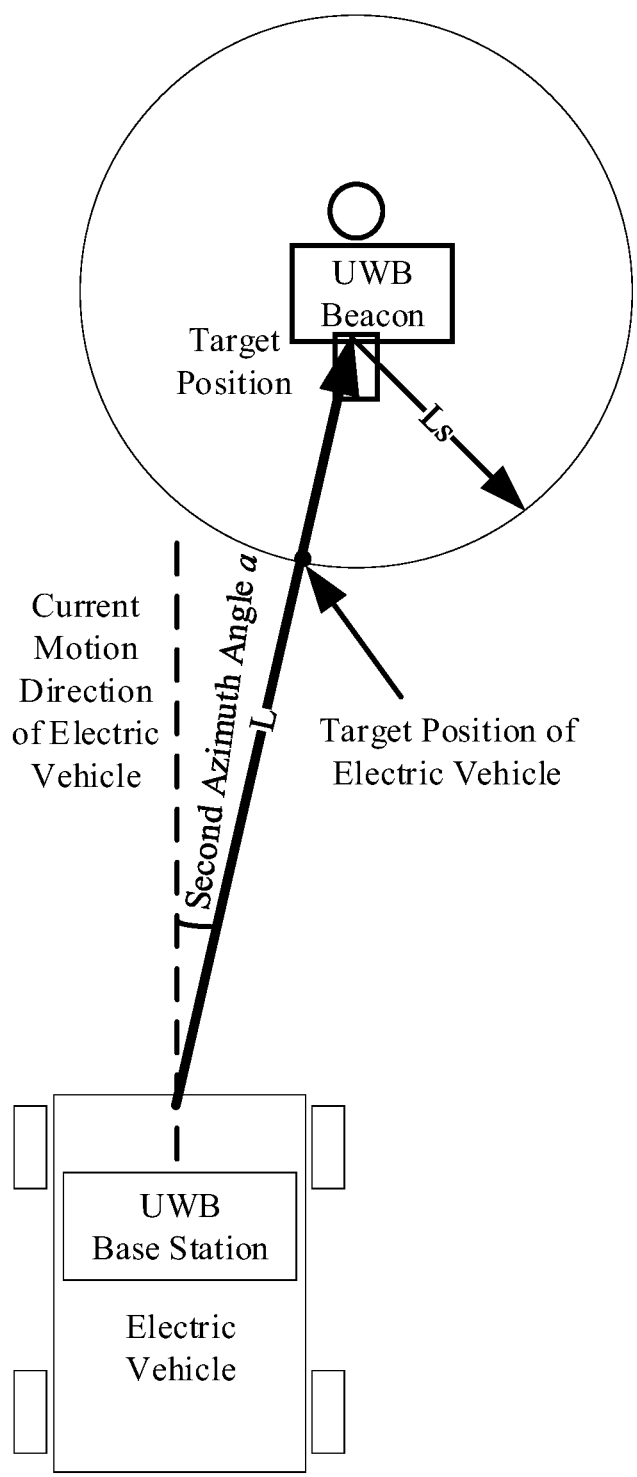
FIG. 7 is a schematic diagram showing a principle of a third side following mode according to an embodiment.

In another example, FIG. 7 shows a principle of the third side following mode. In this example, the target following apparatus is an electric vehicle, and the target to be followed is a person. In the third side following mode, since the lateral safety distance is zero, that is, the target position is the position of the target to be followed. The current direction of the movement of the electric vehicle is the current direction of the movement of the target following apparatus. The current orientation of the antenna of the UWB base station is located on the straight line where the UWB beacon and the UWB base station are located. a is the second azimuth angle of the line where the target position and the UWB base station are located related to the current direction of the movement of the target following apparatus. L is the current distance between the target position and the UWB base station, that is, the current distance between the UWB beacon and the UWB base station. Ls is the minimum following distance. A control flow in the third side following mode in the example as shown in FIG. 7 corresponds to a situation where S is close to 0 in FIG. 6. When S=0, L=Lm, the first azimuth angle b=0, the second angle d=0, the first angle c=0, and the second azimuth angle a is equal to the first angle c.

As described above, in the present disclosure, the first orientation data sent by the UWB base station and the following mode sent by the UWB beacon are acquired. Based on the following mode, the inverse trigonometric function is used to process the lateral safety distance and the distance between the UWB beacon and the UWB base station to obtain the second angle between the straight line in which the UWB beacon and the UWB base station are located and the straight line in which the target location and the UWB base station are located. Then, a distance between the target position and the UWB base station is obtained according to the second angle and the distance between the UWB beacon and the UWB base station. The second azimuth angle is determined according to the first azimuth angle, the first angle and the second angle. Then, the current distance between the target position and the UWB base station is compared with the minimum following distance, and the second azimuth angle is compared with the range of angle errors. The movement of the target following apparatus is controlled according to the comparison result, and the target following apparatus is kept in a following state corresponding to the following mode. In the present disclosure, the reliability of following the target can be ensured, and the target following apparatus can accurately and reliably follow the target. In addition, the present disclosure further provides different kinds of following modes. Lateral following (the first side following mode and the second side following mode) can ensure that the target following apparatus is within the visible area of the user's peripheral vision, making the following process more reassuring, and more conducive to avoiding unexpected situations in use. It further improves the controllability and reliability of the following process, while the safety during the following process is ensured. Moreover, it is also convenient to flexibly change the following mode according to the situation of the road, which improves the practicability.

It should be understood that, although the steps in the flowcharts of FIG. 1 to FIG. 4 and FIG. 6 in the above embodiments are sequentially shown by the indications of the arrows, these steps are not necessarily executed in the order indicated by the arrows. Unless explicitly stated herein, the execution of these steps is not strictly limited to the order, and the steps may be executed in other orders. Moreover, at least a part of the steps in the flowcharts in FIGS. 1-4 and 6 may include multiple steps or multiple stages, and these steps or stages are not necessarily executed and completed at the same time, bat may be performed at different times. The execution order of these steps or stages is not necessarily sequential, but may be performed alternately or in turn with other steps or at least a part of the steps or stages of the other steps.

Figure 8:
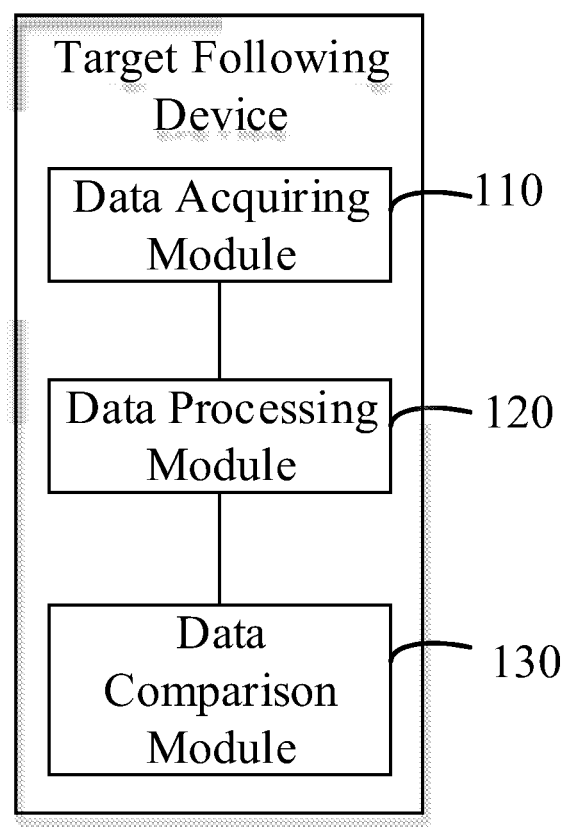
FIG. 8 is a block diagram showing a configuration of a target following device according to an embodiment.

In an embodiment, as shown in FIG. 8, a target following device is further provided. The target following device includes a data acquiring module 110, a data processing module 120, and a data comparison module 130.

The data acquiring module 110 is configured to acquire the first orientation data sent by the UWB base station and the following mode sent by the UWB beacon. The UWB base station is arranged on the target following apparatus, and the UWB beacon is arranged on the target. The first orientation data includes the current distance between the UWB beacon and the UWB base station, the first azimuth angle of the line in which the UWB beacon and the UWB base station are located with respect to a current orientation of an antenna of the UWB base station, and the first angle between the current orientation of the antenna of the UWB base station and a current direction of a movement of the target following apparatus.

The data processing module 120 is configured to process the first orientation data to obtain the second orientation data based on the following mode, the second orientation data includes a current distance between a target position and the UWB base station, and a second azimuth angle of a straight line in which the target position and the UWB base station are located with respect to the current direction of the movement of the target following apparatus.

The comparison module 130 is configured to compare the second orientation data with the preset orientation data to obtain the comparison result, and control the target following apparatus to perform target following according to the comparison result.

In an embodiment, the straight line in which the target position and the UWB base station are located is perpendicular to the line in which the target position and the UWB beacon are located.

The data processing module 120 is further configured to process the lateral safety distance and the distance between the UWB beacon and the UWB base station by using the inverse trigonometric function to obtain the second angle between the straight line in which the UWB beacon and the UWB base station are located and the straight line in which the target position and the UWB base station are located, obtain the current distance between the target position and the UWB base station based on the second angle and the current distance between the UWB beacon and the UWB base station, and determine the second azimuth angle according to the first azimuth angle, the first angle and the second angle.

In an embodiment, the following mode includes the first side following mode, the second side following mode, and the third side following mode.

The data processing module 120 is further configured to:

obtain the second azimuth angle based on the following equation on a condition that the following mode is the first side following mode:

$$a=c+b-d;$$

obtain the second azimuth angle based on the following equation on a condition that the following mode is the second side following mode:

$$a=c+b+d;$$

obtain the second azimuth angle based on the following equation on a condition that the following mode is the third side following mode:

$$a=b+c;$$

where a is the second azimuth angle, b is the first azimuth angle, c is the first angle, and d is the second angle.

In an embodiment, the preset orientation data may include a minimum following distance.

The comparison module 130 is further configured to control the target following apparatus to stop in the condition that the comparison result is that the current distance between the target position and the UWB base station is less than or equal to the minimum. Mowing distance, and control the target following apparatus to move toward the target position in the condition that the comparison result is that the current distance between the target position and the UWB base station is greater than the minimum following distance.

In an embodiment, the preset orientation includes a range of angle errors.

The data comparison module 130 is further configured to control the target following apparatus to turn to the first direction on a condition that the comparison result is that the second azimuth angle is less than zero and the second azimuth angle is outside the range of angle errors, control the target following apparatus to turn to the second direction on a condition that the comparison result is that the second azimuth angle is greater than zero and the second azimuth angle is outside the range of angle errors, and control the target following apparatus to move along the current movement direction on a condition that the comparison result is that the second azimuth angle is within the range of angle errors.

For the specific limitation of the target following device, reference may be made to the definition of the target following method above, which will not be repeated herein. The modules in the above target following device can be implemented in whole or in part by software, hardware and combinations thereof. The above modules can be embedded in or independent of a processor in a computer device in a form of hardware, or stored in a memory in the computer device in a form of software, so that the processor can call and execute the operations corresponding to the above modules. It should be noted that, the division of modules in the embodiments of the present disclosure is schematic, and is only a logical function division, and there may be other division manners in actual implementation.

Figure 9:
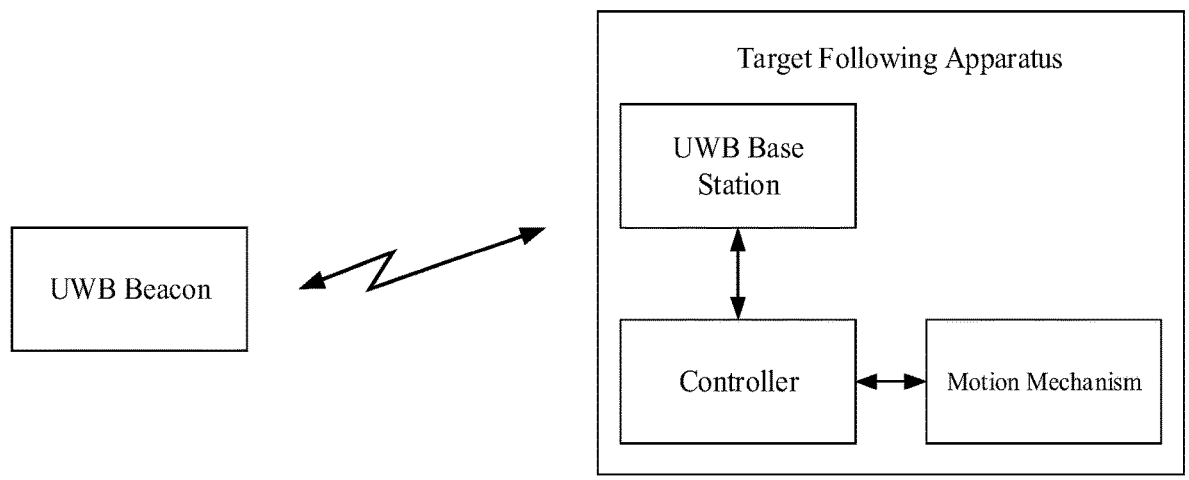
FIG. 9 is a block diagram showing a configuration of a target following apparatus according to an embodiment.

In an embodiment, as shown in FIG. 9, a target following apparatus is provided. The target following apparatus may include the UWB base station, a motion mechanism, and a controller. The controller is connected to the UWB base station and the motion mechanism respectively.

The UWB base station is configured to detect and output the first orientation data. The first orientation data includes the current distance between the UWB beacon and the UWB base station, the first azimuth angle of the line in which the UWB beacon and the UWB base station are located with respect to the current orientation of the antenna of the UWB base station, and the first angle between the current orientation of the antenna of the UWB base station relative to the current direction of the movement of the target following apparatus.

The controller is configured to execute the steps of the above target following method, as well as to control actions of the motion mechanism.

The controller can be a device with computing and control capabilities such as a microcontroller unit (MCU), a programmable logic controller (PLC), or a computer. When executing the steps of the above method, based on an allocation of system resources, more calculation steps can be allocated to the MCU of the UWB base station, or to the MCU of the target following apparatus, or to both the MCU of the UWB base station and the MCU of the target following apparatus, as long as the operation requirement is achieved and the steps are executed. The target following apparatus can be an electric vehicle, and can also be other moving objects that can be controlled by the controller such as a vehicle with other forms of power, a luggage case with power and steering control. The target can be a person or other movable objects. The UWB beacon can further include components such as buttons, batteries, and a display unit. The UWB beacon can be made into an apparatus with a size of a small remote control or a watch, which is convenient for people to hold or wear. The motion mechanism can be driven by double motors and, use left and right differential turning to realize functions such as movement, turning and speed change, or by separating the motor driving from the steering wheel mechanism. The UWB base station refreshes the current distance L between the target position and the UWB base station and the second azimuth angle a in each control cycle. The refresh rate may be 10 times per second to 200 times per second to ensure sufficient control accuracy and remote control timeliness.

Figure 10:
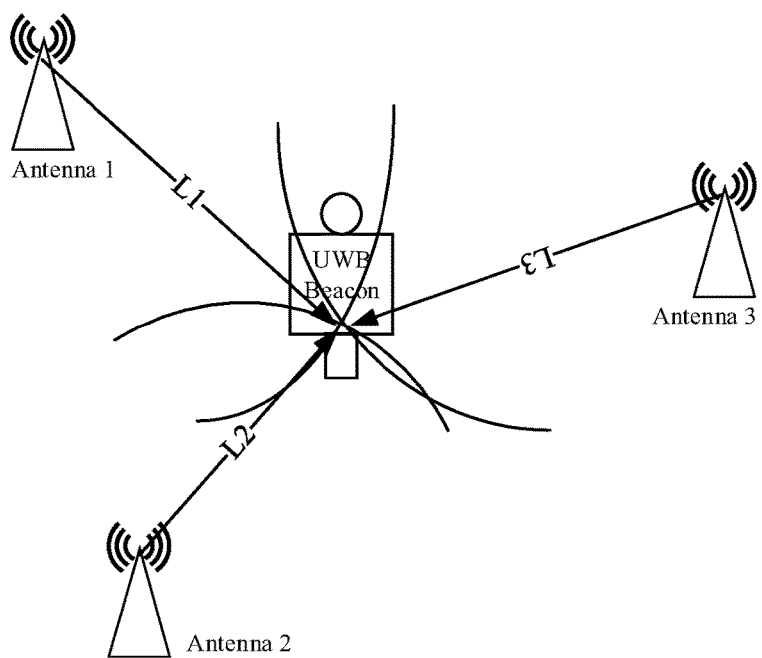
FIG. 10 is a schematic diagram showing a principle of a UWB base station performing a measurement using TOA according to an embodiment.
Figure 11:
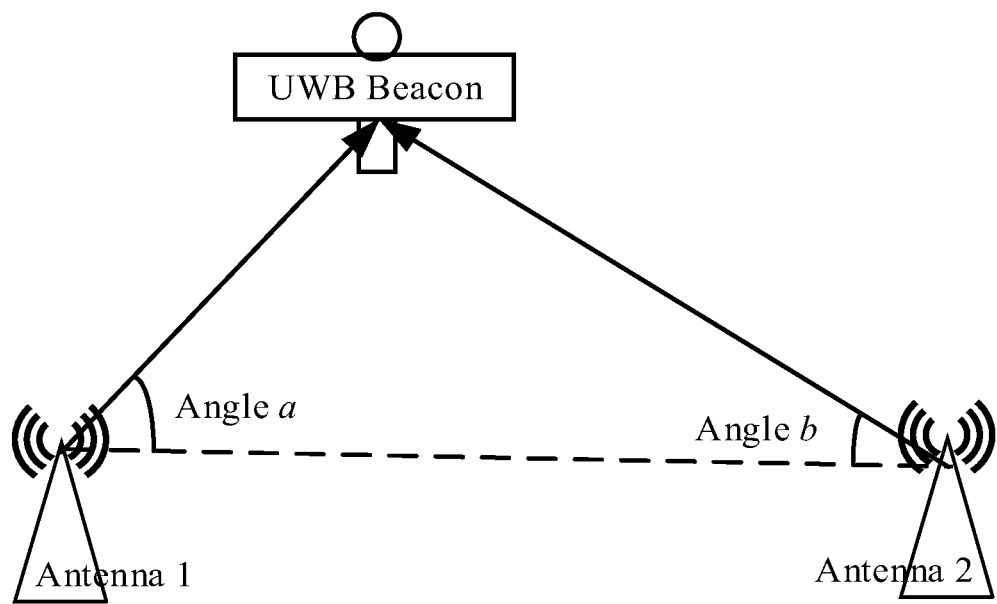
FIG. 11 is a schematic diagram showing a principle of UWB base station performing a measurement using AOA according to an embodiment.

The UWB base station can use time of arrival (TOA), time difference of arrival (TDOA), or angle-of-arrival (AOA) to accurately measure the relative distance and angles relative to the UWB beacon arranged on the target to be followed. When using the TOA for the measurement, as shown in FIG. 10, at least three antennas need to be used by the UWB base station. The three antennas are arranged on the vehicle (target following apparatus) in a relatively fixed position. The distances (L1, L2 and L3) between each of the three antennas of the UWB base station and the UWB beacon is calculated by calculating a signal travel time between each antenna and the UWB beacon, and then the orientation data of the UWB beacon can be calculated based on the distances L1, L2 and L3 by using trilateration. When using the TDOA for the measurement, at least three antennas need to be used by the UWB base station, and the three antennas are arranged on the vehicle (target following apparatus) in a relatively fixed position. The orientation data of the UWB beacon can be calculated based on differences between times when a signal sent by the UWB beacon arrives at the three antennas. The three antennas must be synchronized in time. When using the AOA for the measurement, as shown in FIG. 11, a difference between phases at which a beacon signal sent by the UWB beacon arriving at two antennas of the UWB base station is used to calculate the angles (angle a and angle b) of the beacon signal sent by the UWB beacon arriving at the two antennas of the UWB base station, and the orientation data of the UWB beacon is calculated based on the angle a and the angle b.

In each following mode, if the target following apparatus is far enough from the target to be followed and the azimuth angle of the target to be followed is too large, the MCU can control the target following apparatus to turn at the current position first to reduce the azimuth angle of the target to be followed, and then control the target following apparatus to move forward to make the route of the target following apparatus more reasonable.

Control commands can be transmitted between the UWB beacon and the UWB base station while the UWB base station performs positioning. The UWB beacon can send information such as its own state, a forward command, a stop command and the following mode by pressing corresponding buttons on the UWB beacon. On a condition that the UWB base station receives the stop command, the target following apparatus is controlled to stop no matter how far the target following apparatus is from the UWB beacon. Only when the UWB base station receives the following mode from the UWB beacon, the second orientation is calculated and the target following apparatus is controlled to perform the following process in the corresponding following mode according to the received following mode (during the performance of the following mode, a remote control command sent by the UWB beacon may be received first to determine whether the command is the following mode, and if so, a following command sent by the UWB beacon is received and the following process is performed in response to the following command).

If the UWB base station receives information on insufficient voltage sent by the UWB beacon, the UWB base station transmits the information on insufficient voltage to the MCU of the target following apparatus by wireless or wired means, and the MCU will not execute the following command to avoid action errors caused by the loss of data due to the UWB beacon running out of power. When the UWB beacon cannot communicate with the UWB base station normally, the UWB beacon can use vibration, flashing light, sound and other reminders to remind the user that the target following apparatus is in a disconnected state, so as to prevent the target following apparatus from being lost. If the UWB base station cannot receive the signal form the UWB beacon, the UWB base station informs the MCU of the target following apparatus that the UWB beacon is lost, and the MCU can control the target following apparatus to stop in time to avoid action errors.

The MCU of the target following apparatus can also transmit operational data (such as voltage, temperature and other information of the target following apparatus) that the user cares about to the UWB base station, and the UWB base station can transmit the operational data to the UWB beacon for display or processing, so that the user can be informed, of various operational and state information of the target following apparatus even if the user is not beside the target following apparatus. The UWB beacon can also include other operation buttons according to actual needs, and transmit control commands to the MCU of the target following apparatus through the UWB communication, so that corresponding functions can be operated by various configurations on the target following apparatus. Sufficient bandwidth is also available between the vehicle (target following apparatus) and the UWB beacon for multimedia data transmission (e.g. video, audio, text, etc.).

In an embodiment, the target following apparatus can further include a rotating mechanism.

The rotating mechanism is configured to carry the antenna of the UWB base station to perform 360-degree rotation to track the direction of the UWB beacon, so that the antenna of the UWB base station always faces the UWB beacon.

Figure 12:
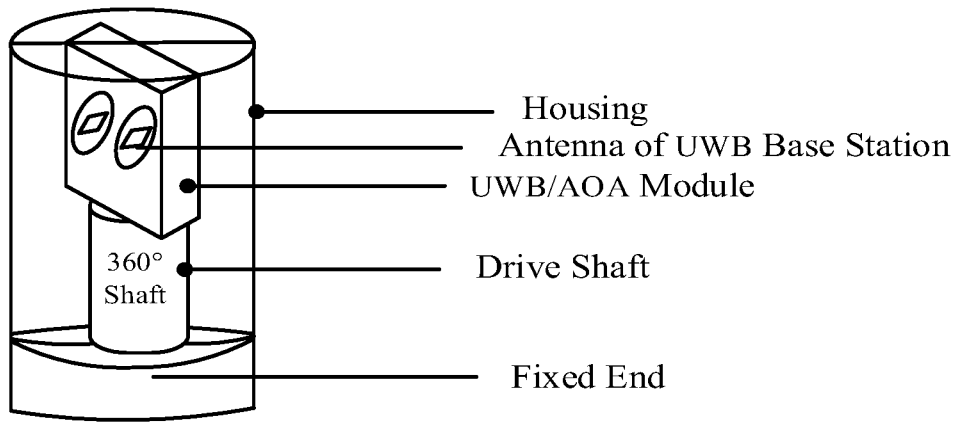
FIG. 12 is a schematic diagram showing a configuration of a UWB base station according to an embodiment.

In detail, as shown in FIG. 12, the antennas of the UWB base station and the rotating mechanism may be mounted inside the housing of the UWB base station. When using the AOA for measurement, the antennas of the UWB base station may be located on the rotating mechanism (drive shaft in FIG. 7) that can be driven by a motor to rotate 360°, and thus the antennas of the UWB base station can rotate at any time to ensure that the antennas always face the UWB beacon at an angle of ±5° (positive and negative error<±60°). This design satisfies the effective measurement angle of the UWB antenna of +60° when using the AOA, and avoids the UWB beacon falling out of the receiving angle. One end of the rotating mechanism is fixed on the vehicle (the target following apparatus), and the other end carries the antennas of the UWB base station for 360° rotation to track the direction of the UWB beacon. An angle encoder is used between the fixed end and the rotating end to measure the first azimuth angle b (−180°<b<180°) of the line where the UWB beacon and the UWB base station are located with respect to current orientation of the antenna of the UWB base station. Further combining the current distance Lm between the UWB beacon and the UWB base station measured by the UWB base station and the first angle c (−60°<c<60°) between the current orientation of the antenna of the UWB base station and the current direction of the movement of the target following apparatus, the second orientation data can be obtained based on the above target following method. The second orientation includes the current distance between the target position and the UWB base station, and the second azimuth angle of the straight line in which the target position and the UWB base station are located with respect to the current direction of the movement of the target following apparatus.

Furthermore, the rotating device can also be used as a rotating gimbal for video recording. Video cameras can be arranged on the rotating mechanism to ensure that lens of the video cameras always face the target to be followed, and the dynamic video recording of the target to be followed is performed in real time throughout the whole process.

As described above, in the present disclosure, by using the latest UWB with 10 cm level of high-precision positioning technology, the angle measurement technology, and high-speed communication technology, the target following apparatus realizes a close follow-up to the target to be followed and the exchange of the data. Besides, by using the trigonometric function for calculation, the target following apparatus can not only follow behind the target, but also follow the target on the left side on the right side, which is especially suitable for close follow-up for indoor and outdoor occasions such as a supermarket, an airport, a station, a workshop, a golf course, etc. Moreover, by using the communication function of the UWB, the UWB beacon can remotely control the target following apparatus, and two-way data exchange can be realized between the UWB beacon and the UWB base station, so that the user can grasp the operating state of the target following apparatus at any time, and a sound or vibration reminder can be performed at the UWB beacon when the signal between the UWB base station and the UWB beacon is lost, thereby greatly improving the practicability.

Figure 13:
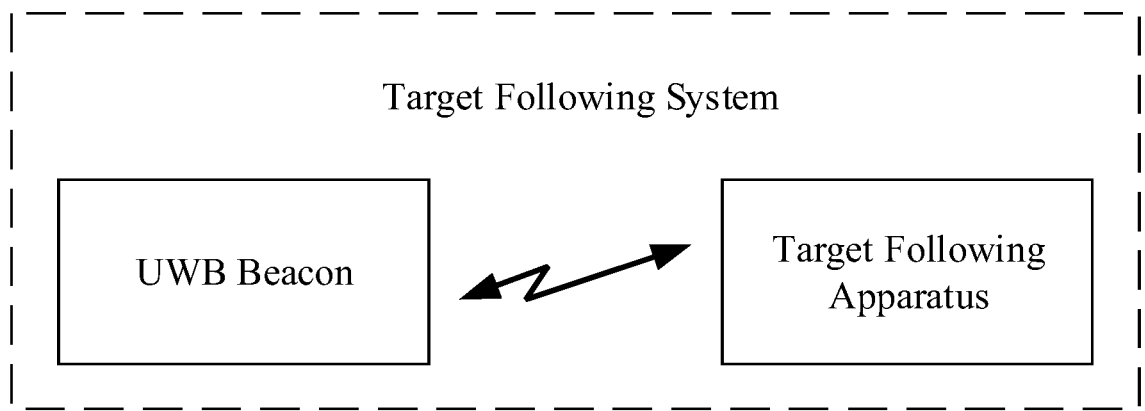
FIG. 13 is a block diagram showing a configuration of a target following system according to an embodiment.

In an embodiment, as shown in FIG. 13, a target following system is provided. The target following system may include the UWB beacon and the above-mentioned target following apparatus. The UWB beacon is arranged on the target to be followed.

The UWB beacon is configured to output the following mode to the target following apparatus; the target following apparatus is configured to receive the following mode and perform the following process based on the following mode.

As described above, by using the UWB to perform high-precision positioning, the target following system of the present disclosure can control the target following apparatus such as electric vehicles to follow behind the target or on the side of the target. The target following apparatus can be precisely controlled to closely follow the target, which is suitable for traveling in narrow places. Besides, in actual use, the user may feel worried if the vehicle follows behind the user. Side following makes the vehicle can be seen in the peripheral vision of the user, and the state update function realized by the two-way communication of the UWB makes the user's use more intuitive and more secure, and avoids the loss or loss of control of the vehicle. Furthermore, in the present disclosure, by using the two-way communication function of the UWB, the remote control of the target following apparatus is realized, and various parameter states of the target following apparatus can also be monitored, so that the following performance of the target following apparatus is more controllable and reliable. It is also possible to add more remote control functions to the target following apparatus according to actual needs. The UWB beacon can further remind the user in various ways such as sound, light and vibration in the case of an accident, for example, the target following apparatus is lost, the UWB beacon loses contact or the distance to the UWB beacon is too far, therefore the risk of loss or damage of the target following apparatus due to unexpected actions can be avoided, which effectively improves the practicability. The frequency band of 1G to 6.5G used by the UWB has a stronger penetrating power, and the signal is not easy to be occluded due to occlusion, which makes the following performance more reliable. Furthermore, the update rate of the positioning information between the UWB base station and the UWB beacon can range from 10 to 200 times per second or even higher. After data filtering by the MCU, the forward speed and angle of the target following apparatus can be controlled more accurately and continuously. Moreover, the UWB base station and UWB beacon of the present disclosure can be designed to realize miniaturization, and the miniaturized UWB base station makes the design of the target following apparatus more flexible. The miniaturized UWB beacon can be made into an apparatus with a size of a small remote control or a watch, which improves portability and usability.

In an embodiment, a computer-readable storage medium is further provided. A computer program is stored in the computer-readable storage medium, and when the computer program is executed by a processor, the steps of the method provided by the above embodiments are executed.

Above mentioned technical schemes has the following advantages and beneficial effects. In the present disclosure, the first orientation data sent by the UWB base station arranged on the target following apparatus is obtained, and the following mode sent by the UWB beacon set on the target is obtained. Based on the following mode, the first orientation data is processed to obtain the second orientation data. The first orientation data includes the current distance between the UWB beacon and the UWB base station, the first azimuth angle of the straight line where the UWB beacon and the UWB base station are located with respect to the current orientation of the antenna of the UWB base station, and the first angle between the current orientation of the antenna of the UWB base station and the current direction of the movement of the target following apparatus. The second orientation data includes the current distance between the target position and the UWB base station, and the second azimuth angle of the straight line in which the target position and the UWB base station are located with respect to the current direction of the movement of the target following apparatus. In the present disclosure, the second orientation data is further compared with the preset orientation data to obtain the comparison result for controlling the action of the target following apparatus. A signal between the UWB base station and the UWB beacon used in this disclosure has a strong penetrating power, and it is not easy to cause signal shielding due to occlusion, which improves the reliability of target following, and realizes accurate and reliable target following. In addition, the present disclosure provides various following modes for the target object, so that the following modes can be flexibly changed according to a situation of the road, and the practicability is greatly improved.

Those of ordinary skill in the art can understand that all or part of the processes in the methods of the above embodiments can be implemented by instructing relevant hardware through a computer program, and the computer program can be stored in a non-volatile computer-readable storage medium, when the computer program is executed, it can implement the processes of the above-mentioned method embodiments. Any reference to a memory, a storage, a database or other media used in the embodiments provided in this disclosure may include at least one of a non-volatile and a volatile memory. The non-volatile memory may include read-only memory (ROM), magnetic tape, floppy disk, flash memory, or optical memory and the like. Volatile memory may include random access memory (RAM) or external cache memory. By way of illustration and not limitation, the RAM may be in various forms, such as static random access memory (SRAM) or dynamic random access memory (DRAM).

In the description of this disclosure, reference to the description of the terms "some embodiments", "other embodiments", "ideal embodiments" etc. is intended to refer to a specific feature, configuration, material, or characteristic described in connection with that embodiment or example included in at least one embodiment or example of the present disclosure. In this specification, schematic descriptions of the above terms do not necessarily refer to the same embodiment or example.

The technical features in the above embodiments may be randomly combined. In order to make the description concise, not all possible combinations of the technical features in the above embodiments are described. However, all the combinations of the technical features are to be considered as falling within the scope described in this specification provided that they do not conflict with each other.

The above-mentioned embodiments only illustrate several embodiments of the present disclosure, and the descriptions thereof are relatively specific and detailed, bat should not be construed as a limitation on the scope of the patent of the present disclosure. It should be noted that for those skilled in the art, without departing from the concept of the present disclosure, several modifications and improvements can be made, which all fall within the protection scope of the present disclosure. Therefore, the scope of protection of the present disclosure shall be subject to the appended claims.

What is claimed is:

1. A target tracking method comprising:
   acquiring first orientation data sent by an UWB base station and a following mode sent by an UWB beacon, the UWB base station being arranged on a target following apparatus, the UWB beacon being arranged on a target to be followed, the first orientation data comprising a current distance between the UWB beacon and the UWB base station, a first azimuth angle of a straight line in which the UWB beacon and the UWB base station are located with respect to a current orientation of an antenna of the UWB base station, and a first angle between the current orientation of the antenna of the UWB base station and a current direction of a movement of the target following apparatus;

processing, based on the following mode, the first orientation data to obtain second orientation data, the second orientation data comprising a current distance between a target position and the UWB base station, and a second azimuth angle of a straight line in which the target position and the UWB base station are located with respect to the current direction of the movement of the target following apparatus; and comparing the second orientation data with preset orientation data to obtain a comparison result, and controlling the target following apparatus to perform target following according to the comparison result.

2. The method according to claim 1, wherein the straight line in which the target position and the UWB base station are located is perpendicular to a straight line in which the target position and the UWB beacon are located, and the processing, based on the following mode, the first orientation data to obtain second orientation data comprises:

processing a lateral safety distance and the distance between the UWB beacon and the UWB base station by using an inverse trigonometric function to obtain a second angle between the straight line in which the UWB beacon and the UWB base station are located and the straight line in which the target position and the UWB base station are located;

obtaining a current distance between the target position and the UWB base station based on the second angle and the current distance between the UWB beacon and the UWB base station; and determining a second azimuth angle based on the first azimuth angle, the first angle and the second angle.

3. The method according to claim 2, wherein the following mode comprises a first side following mode, a second side following mode, and a third side following mode, and the determining the second azimuth angle based on the first azimuth angle, the first angle and the second angle comprises:

calculating the second azimuth angle based on a following equation on a condition that the following mode is the first side following mode:

$a=c+b-d;$ calculating the second azimuth angle based on a following equation on a condition that the following mode is the second side following mode:

$a=c+b+d;$ calculating the second azimuth angle based on a following equation on a condition that the following mode is the third side following mode:

$a=b+c;$ wherein a is the second azimuth angle, b is the first azimuth angle, c is the first angle, and d is the second angle.

4. The method according to claim 1, wherein the preset orientation data comprises a minimum following distance, and the controlling the target following apparatus to perform target following according to the comparison result comprises:

controlling the target following apparatus to stop on a condition that the comparison result is that the current distance between the target position and the UWB base station is less than or equal to the minimum following distance; and controlling the target following apparatus to move to the target position on a condition that the comparison result is that the current distance between the target position and the UWB base station is greater than the minimum following distance.

5. The method according to claim 1, wherein the preset orientation comprises a range of angle errors, and the controlling the target following apparatus to perform the target following according to the comparison result comprises:

controlling the target following apparatus to tarn to a first direction on a condition that the comparison result is that the second azimuth angle is less than zero and the second azimuth angle is outside the range of angle errors;

controlling the target following apparatus to turn to a second direction on a condition that the comparison result is that the second azimuth angle is greater than zero and the second azimuth angle is outside the range of angle errors; and controlling the target following apparatus to move along a current direction of the movement of the target following apparatus on a condition that the comparison result is that the second azimuth angle is within the range of angle errors.

6. A target following device comprising:

a data acquiring module configured to acquire first orientation data sent by an UWB base station and a following mode sent by an UWB beacon, the UWB base station being arranged on a target following apparatus, the UWB beacon being arranged on a target to be followed, the first orientation data comprising a current distance between the UWB beacon and the UWB base station, a first azimuth angle of a straight line in which the UWB beacon and the UWB base station are located with respect to a current orientation of an antenna of the UWB base station, and a first angle between the current orientation of the antenna of the UWB base station and a current direction of a movement of the target following apparatus;

a data processing module configured to process the first orientation data to obtain second orientation data based on the following mode, the second orientation data comprising a current distance between a target position and the UWB base station, and a second azimuth angle of a straight line in which the target position and the UWB base station are located with respect to the current direction of the movement of the target following apparatus; and a data comparison module configured to compare the second orientation data with preset orientation data to obtain a comparison result, and control the target following apparatus to perform target following according to the comparison result.

7. A target following apparatus comprising:

an UWB base station;

a motion mechanism; and a controller connected, to the UWB base station and the motion mechanism respectively;

wherein the UWB base station is configured to detect and output first orientation data, the first orientation data comprises a current distance between the UWB beacon and the UWB base station, a first azimuth angle of a straight line in which the UWB beacon and the UWB base station are located with respect to a current orientation of an antenna of the UWB base station, and a first angle between the current orientation of the antenna of the UWB base station and a current direction of a movement of the target following apparatus;

the controller is configured to execute steps of the method according to claim 1, and control actions of the motion mechanism.

8. The target following apparatus according to claim 7, further comprising a rotating mechanism, wherein the rotating mechanism is configured to carry an antenna of the UWB base station to perform 360-degree rotation to track a direction of the UWB beacon to make the antenna of the UWB base station always face the UWB beacon.

9. A target following system comprising an UWB beacon and the target following apparatus of claim 7, wherein the UWB beacon is arranged on a target to be followed, and the UWB beacon is configured to send a following mode to the target following apparatus, and wherein the target following apparatus is configured to receive the following mode and perform target following based on the following mode.

10. A non-volatile computer-readable storage medium, on which a computer program is stored, wherein when the computer program is executed by a processor, steps of the method according to claim 1 are executed.

* * * * *